(12) United States Patent
Allu et al.

(10) Patent No.: US 10,496,542 B1
(45) Date of Patent: Dec. 3, 2019

(54) INPUT/OUTPUT PATTERNS AND DATA PRE-FETCH

(71) Applicant: EMC IP Holding Company LLC, Hopkinton, MA (US)

(72) Inventors: Yamini Allu, Sunnyvale, CA (US); Philip N. Shilane, Newtown, PA (US); Grant R. Wallace, Pennington, NJ (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 150 days.

(21) Appl. No.: 15/499,364

(22) Filed: Apr. 27, 2017

(51) Int. Cl.
 *G06F 12/08* (2016.01)
 *G06F 12/0862* (2016.01)
 *G06F 12/0808* (2016.01)
 *G06F 12/0846* (2016.01)

(52) U.S. Cl.
 CPC ...... *G06F 12/0862* (2013.01); *G06F 12/0808* (2013.01); *G06F 12/0848* (2013.01); *G06F 2212/282* (2013.01); *G06F 2212/602* (2013.01); *G06F 2212/6024* (2013.01); *G06F 2212/6026* (2013.01); *G06F 2212/621* (2013.01)

(58) Field of Classification Search
 CPC .... G06F 12/0862; G06F 3/061; G06F 3/0653; G06F 2212/602; G06F 3/0659; G06F 2212/6024; G06F 2212/6026; G06F 3/0656
 See application file for complete search history.

(56) References Cited

U.S. PATENT DOCUMENTS

| | | | | |
|---|---|---|---|---|
| 2006/0080365 | A1* | 4/2006 | Glover | G06F 11/3466 |
| 2007/0106849 | A1* | 5/2007 | Moore | G06F 17/30132 |
| | | | | 711/137 |
| 2015/0143182 | A1* | 5/2015 | Rajamanickam | G06F 11/0781 |
| | | | | 714/48 |
| 2017/0269875 | A1* | 9/2017 | Kim | G06F 3/0659 |

* cited by examiner

*Primary Examiner* — Reginald G Bragdon
*Assistant Examiner* — Thanh D Vo
(74) *Attorney, Agent, or Firm* — Workman Nydegger; Carl T. Reed

(57) ABSTRACT

Systems and methods for determining an access pattern in a computing system. Accesses to a file may contain random accesses and sequential accesses. The file may be divided into multiple regions and the accesses to each region are tracked. The access pattern for each region can then be determined independently of the access patterns of other regions of the file.

18 Claims, 5 Drawing Sheets

INPUT/OUTPUT PATTERNS AND DATA PRE-FETCH

FIELD OF THE INVENTION

Embodiments of the present invention relate to systems and methods for accessing data in a computing system. More particularly, embodiments of the invention relate to systems and methods for pre-fetching data based on access patterns.

BACKGROUND

Data protection systems are designed to perform operations such as backing up data and restoring data. When accessing a data protection system (e.g., reading or writing), the accesses may demonstrate a pattern. For example, when data is being restored from a backup, the read operations may be highly sequential. Often, a backup is performed by writing data to the data protection system sequentially. The performance of data protection systems can improved by predicting future accesses and loading the appropriate metadata and/or data ahead of the access. As a result, the access requires less time to perform because the data has already been loaded into a cache or memory when the request for the data arrives.

When the access pattern is less sequential, it becomes more difficult to predict which data will be requested next or in the future. This results in lower cache hit ratios and thus impacts the performance of the data protection system.

In fact, access patterns in data protection systems have become less sequential in part because the data stored in backup systems is no longer viewed as passive data whose only purpose is to be restored if necessary. When the data stored in a data protection system is leveraged, the access patterns become less sequential. To improve performance and to improve the ability to leverage backed up data, systems and methods are needed more accurately identify access patterns and pre-fetch data.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to systems and methods for pre-fetching data. Embodiments of the invention further relate to systems and methods for pre-fetching data based on IO (Input and/or Output) patterns (also referred to herein as access patterns) in a data protection system. By determining the IO patterns, embodiments of the invention can pre-fetch data (e.g., blocks, chunks, etc.) to store in a cache. This allows subsequent accesses or requests to be serviced more quickly. Pre-fetching or caching data that is expected to be requested will improve the performance of the data protection system.

Embodiments of the invention further relate to systems and methods for detecting or identifying IO patterns that area not strictly sequential or strictly random and/or providing a strategy for pre-fetching data from storage. Generally, a file may be divided into regions. Accesses are tracked with respect to each region. With a sufficient history of accesses, a type of access pattern can be determined for each region. As a result, the appropriate data for each region, as appropriate, can be pre-fetched. Further, the access pattern may change over time and this may have an impact on the pre-fetching strategies and may impact which data, if any, is pre-fetched.

Figure 1:
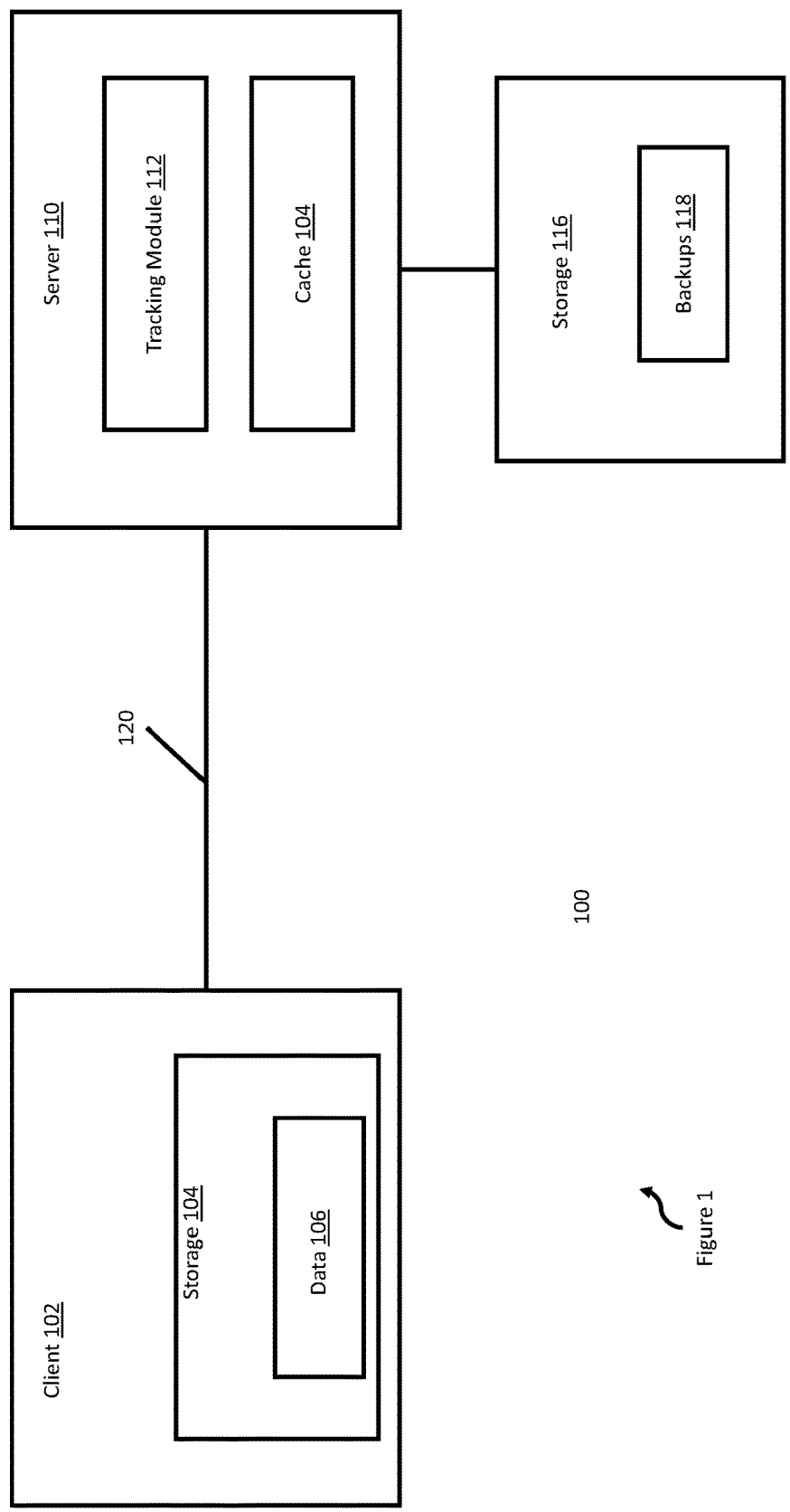
FIG. 1 illustrates an example of a computing system for detecting access patterns and for implementing pre-fetching strategies based on detected access patterns.

FIG. 1 illustrates an example of a computing system for implementing embodiments of the invention. FIG. 1 illustrates a system 100 that includes a client 102 and a server 110. The client 102 and/or the server 110 each include processors, memory (including one or more types of memory and/or one or more cache layers), and other hardware and software. The client 102 and the server 110 may communicate over any type of network (e.g., Local Area Network, Wide Area Network, the Internet) or connection including wireless and/or wired connections.

The client 102 may include or have access to a storage device 104 on which data 106 may be stored. The server 110 may be an example of or part of a data protection system configured to backup and/or restore the data 106 as well as the data of other clients. Thus, the server 110 may include or have access to storage 116 on which backups 118 are stored. The backups 118 may include multiple versions of the data 106 in one example.

The backups 118 may take various forms. The backups 118 may be structured as an image, with a directory-type structure, or the like. Often, the structure of the backup may depend on the source data. In some embodiments, access patterns are detected for a file (e.g., an image, a snapshot, a database, or the like).

FIG. 1 further illustrates a stream 120 (or, more generally, streams) between the client 102 and the server 110. The stream 120 could also represent multiple streams associated with multiple clients. In one example, the stream may include multiple IOs to a single file. The stream 120 may represent a sequence of IOs or an IO pattern or multiple IO patterns associated with multiple streams.

In this example, the server 110 or the data protection system may include a tracking module 112. The tracking module 112, which may include software and/or hardware, may be configured to track IOs in the stream 120. Advantageously, the tracker module 112 may be able to detect, at the storage system level in one embodiment, if the stream 120 includes multiple sequential streams or random plus sequential streams that have interleaving accesses. Absent embodiments of the invention, these accesses will appear random. However, seemingly random accesses may be a mix of sequential or sequential plus random accesses from multiple streams. Detecting the sequential patterns from among the mix of accesses can improve prefetching. Detecting access patterns at the storage system level is distinct from access patterns at a file level.

In addition, embodiments of the invention detect monotonically increasing accesses which may have large gaps in between to help with meta-data prefetching. Associations with IP addresses and with files may also be used to track past access patterns and deduce future access patterns from those clients or files. Thus, access patterns detected by embodiments of the invention may include, but are not limited to, sequential data patterns, random access patterns, random incremental access patterns, mix access patterns (a mix of random and sequential IO on the same file), or the like or any combination thereof. A given implementation may limit the number of access patterns detected.

The tracking module 112 evaluates the accesses that occur and makes a determination as to the type of access patterns associated with the accesses. In other words, the tracking module 112 may detect access patterns. Embodiments of the invention can determine the type of access pattern being performed and then pre-fetch data in anticipation of future accesses to the server 110 or for the data. Embodiments of the invention may operate from the perspective of a file, which may be a backup, an image, a snapshot, or the like.

In one example, the data or chunks of data being pre-fetched are retrieved from the backups 118 in the storage 116 and placed in a cache 104. The cache 104 may be memory (e.g., RAM) or another type of cache storage that is typically faster than the storage 116.

Figure 2:
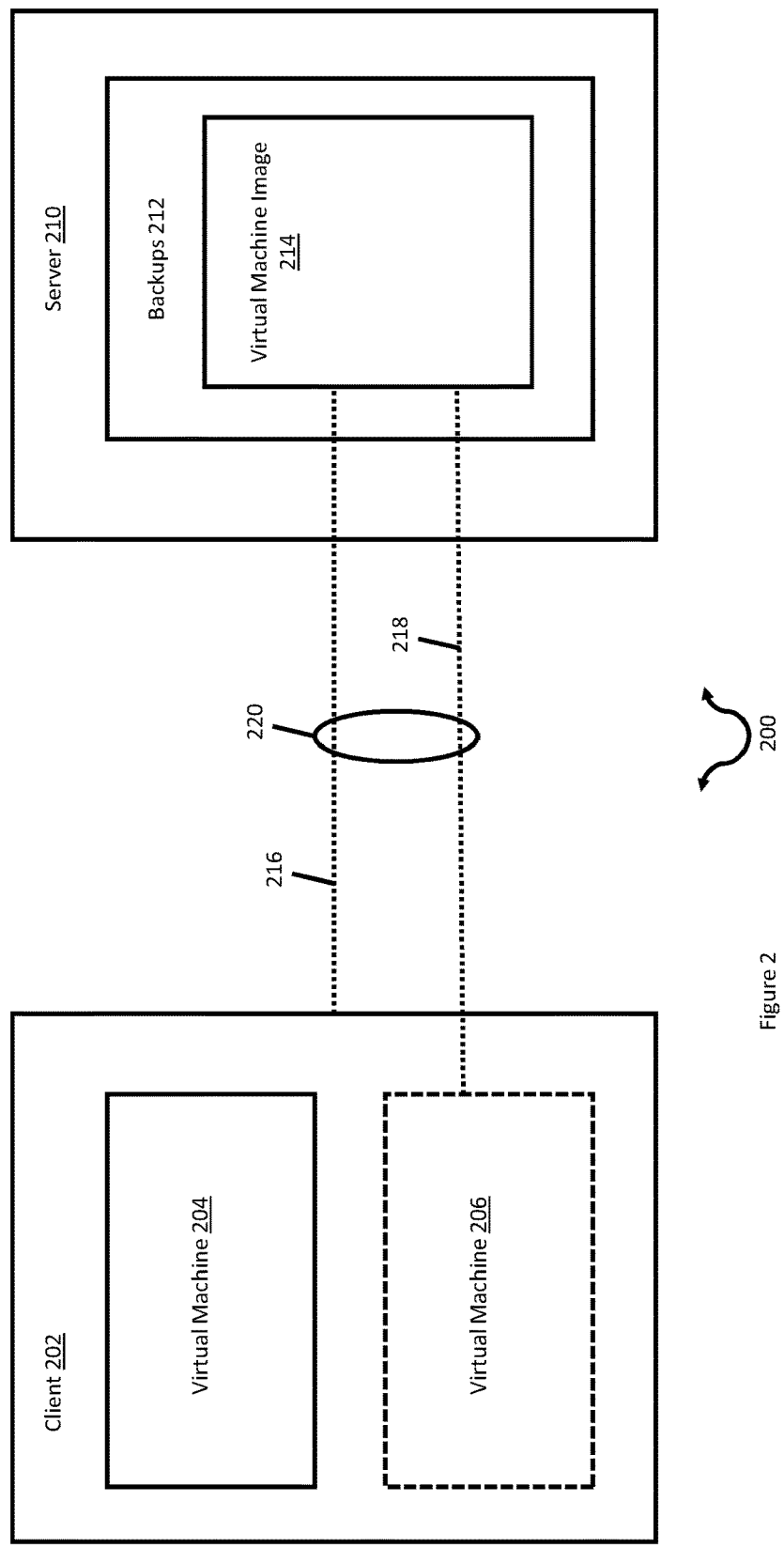
FIG. 2 illustrates an example of detecting access patterns in a computing system when restoring a file or other data.

FIG. 2 illustrates an example of a situation where the accesses or IO is not strictly sequential. Embodiments of the invention, however, are able to detect partly or mostly sequential accesses and identify access patterns for specific regions of a file. FIG. 2 illustrates a client 202 that hosts a virtual machine 204. The server 210 stores a backup or virtual machine image 214 of the virtual machine 204 in the backups 212. FIG. 2 illustrates an example of virtual machine instant access restore, which is where the copy or image 214 of the virtual machine 204 is leveraged.

For example, the virtual machine 204 may fail. In this situation, the virtual machine image 214 can be exposed to an active application by the server 210 (which is also an example of a backup appliance). By exposing the virtual machine image 214, the virtual machine image 214 can be made active. However, the access pattern associated with an active virtual machine is typically random. However, while the application is accessing the virtual machine image 214, a process (e.g., vmotion) can be triggered to restore the virtual machine image 214 back to primary storage on the client 202 or on the primary storage of another host or client (e.g., as the virtual machine 206).

This process or restoring the virtual machine image 214 is a sequential read of the entire image 214 and is a process that may operate in the background. In this example, a stream 220 (e.g., IOs or accesses) is associated with using the virtual machine image 214 as a live virtual machine and for a restore operation are blended at the file system layer with other IO. At the storage level perspective, however, portions of the image 214 may experience random accesses and other portions (e.g., those being restored) may experience sequential access.

In this example, the stream 220 may include multiple streams. For example, the stream 216 may be associated with use of the virtual machine image 214 as a live virtual machine. The stream 218 may be associated with restoring the virtual machine 206 from the virtual machine image 214.

Embodiments of the invention are able to track the accesses included in the stream 220 and identify or distinguish sequential accesses from random accesses. Once the sequential accesses are identified, a strategy can be implemented to cache the data or chunks that are most likely to be accessed in the future. In this case, some of the data associated with the virtual machine image 214 can be cached to improve the performance of the restore operation when this sequential access is detected.

More specifically, FIG. 2 illustrates a scenario where there is a mix of random IO and sequential IO on the same file. In order to detect the sequential data patterns included in the stream 220, embodiments of the invention detect IO patterns at smaller regions of the file in order to isolate the sequential accesses from random accesses. In other words, the file (e.g., the virtual machine image 214) may be divided into regions for pattern detection purposes. Each access or IO to a specific region of the file is tracked and the access pattern for the region can be determined from the history of IOs for that region.

For the region that is currently experiencing sequential IO, there may be some random IOs. However, the number of random IOs that fall into that region will be considerably fewer than the number of sequential IOs. As a result, the access pattern can be detected based on a threshold for random IOs for that region. When appropriate, the region can be tagged or labeled as having a sequential access pattern. The information about this access pattern for that region along with patterns identified for other regions will help determine the amount of data to pre-fetch and how far ahead to pre-fetch the data.

Figure 3:
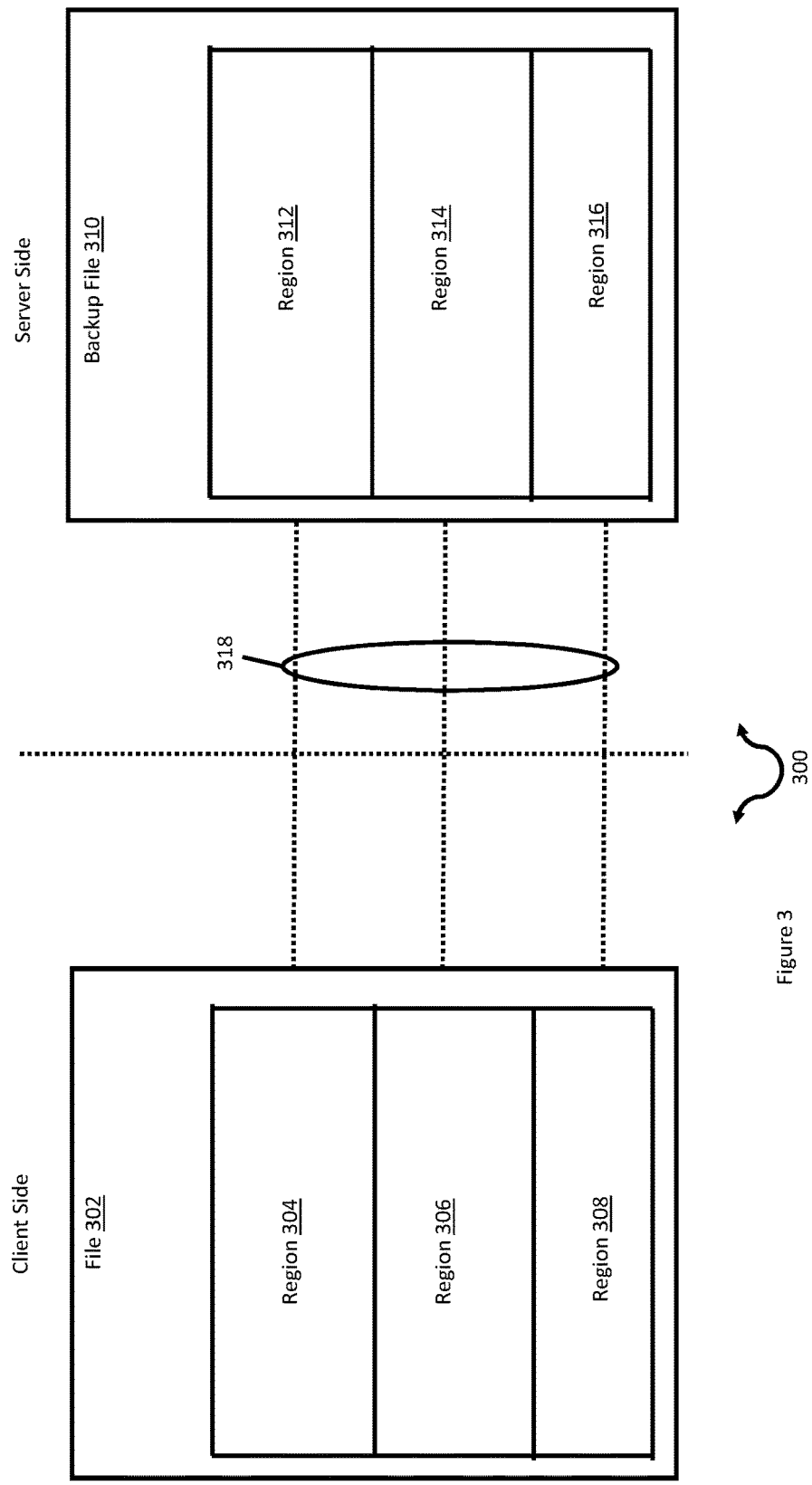
FIG. 3 illustrates another example of detecting access patterns in a computing system when restoring a file or other data using multiple threads.

FIG. 3 illustrates another example where IO or access patterns may be detected. FIG. 3 represents a situation where a file (e.g., an image, a backup, or the like) is restored or backed up in sections or by regions. Thus, multiple threads may be used to read or write data from or to the file. FIG. 3 illustrates an example of a restore operation of a file 302 from a backup file 310. In this example, multiple threads are used to restore the backup file 310. The region 312 is restored to the region 304, the region 314 is restored to the region 306, and the region 316 is restored to the region 308. From a file level, the IO patterns of the streams 318 (e.g., the IOs or accesses) may appear random because of interleaving accesses across regions. However, the accesses with respect to the regions 312, 214, and 316 may be highly sequential. By tracking IOs or accesses with respect to regions, access patterns can be identified and data can be cached or pre-fetched more effectively.

The performance of a data protection operation can be optimized by using multiple threads to perform the data protection operation. This type of parallel access can increase overall throughput. Although the accesses may be sequential with respect to a region, the access pattern at the file level does not appear to be sequential. Embodiments of the invention can track the accesses in a manner that allows sequential or partly sequential accesses to be detected on a per region basis.

In this example, sequential accesses may occur at different regions within the file 304. Each thread, for example, may be performing sequential writes or reads. Embodiments of the invention detect access patterns in the regions, which are granularly smaller than the file. This allows regions associated with sequential access patterns to be identified even when the accesses from the file level perspective appear to be random. Information such as how many parallel sequential threads are in progress can also be determined in embodiments of the invention, and this information may be used in caching algorithms and memory may be tuned accordingly.

In another example, a data protection system or application may optimize for network traffic and host performance.

In this example, only changed data is sent to the backup server when performing a backup operation. This allows for an incremental backup and also allows for the generation of a new full backup based on the incremental changes. In one example, a file in the server 110 may be represented by a hierarchy of references (e.g., a file recipe). Each reference uniquely represents data with a certain offset range. For disk based backups, a copy of previous backups is made by copying the highest level reference representing the entire file and overwriting regions with changed blocks. This optimization allows full backups to be created with high throughput and without the application having to send the data for the entire backup that is mostly unmodified from the previous backup.

However, this type of backup does not typically involve sequential accesses and does not correspond to a sequential access pattern. Rather, the writes to the backup come at random offsets. As a result, there is overhead associated with metadata loads, which increases the latency on writes. Although these writes appear to be at random offsets, backup applications may send the changes in block order. As a result, the pattern is essentially random but with increasing offsets. Embodiments of the invention can also identify this type of pattern as distinct from strictly random accesses and pre-fetch data or metadata associated with increased offsets. This is an example of a random incremental pattern.

Detecting a random incremental pattern helps make decisions to not cache certain metadata once the IO or accesses have crossed a certain offset. In other words, metadata associated with higher offsets may be cached. Alternatively or in addition, this frees space in the cache that can be used to accelerate other accesses. Data associated with offsets that have been crossed, for example, can be evicted from the cache.

The process of detecting an access pattern and implementing pre-fetching strategies may begin when a request is received in the data protection system. For example, a request may be made to restore a file. The file that is the target of the request may be divided into multiple regions. In one example, the file is divided into a maximum number of regions (e.g., a supported number of regions) to determine a region size. For example, if the data protection system supports a minimum region size of 2 GB, the file that is being read (or written or created) may be divided into the maximum number of regions based on the minimum region size.

For each region, a context history is maintained. The context history records the history of IOs received in the past. The size of the history may depend on memory availability and configuration. For example, a certain number of accesses (e.g., 10-20 or more or less) may be recorded in the context history of each region. Every IO that is received by the filesystem for that file is mapped into one of the regions and recorded in the context history.

In one example, for every access that is recorded, a current access pattern may be recorded and returned. Further, the access pattern for a given region may be evaluated every time an access is received or in a periodic manner. Over time, the access pattern for a region may change and this allows the data protection system to adapt to changing access patterns. The access pattern returned may be, by way of example only, sequential, random, or random incremental. As previously stated, a sequential access pattern may be detected and returned even when the access pattern includes random accesses. In one example, the number of sequential or random accesses recorded in a given region is used to determine the access pattern for that region. An IO (and the region) may be marked sequential if it is adjacent (even by a threshold of bytes in some embodiments) to any of the IOs in that region that are recorded in the context history. The region may be marked random incremental if it is not sequential, but the offset is higher than any of the recorded IOs. The IO and/or the region may be marked or recorded as random if it is not sequential or random incremental. Thus specific IO can be marked as sequential, random, etc. At the same time, a group of IOs can be evaluated to mark or determine an access pattern for a region.

Figure 4:
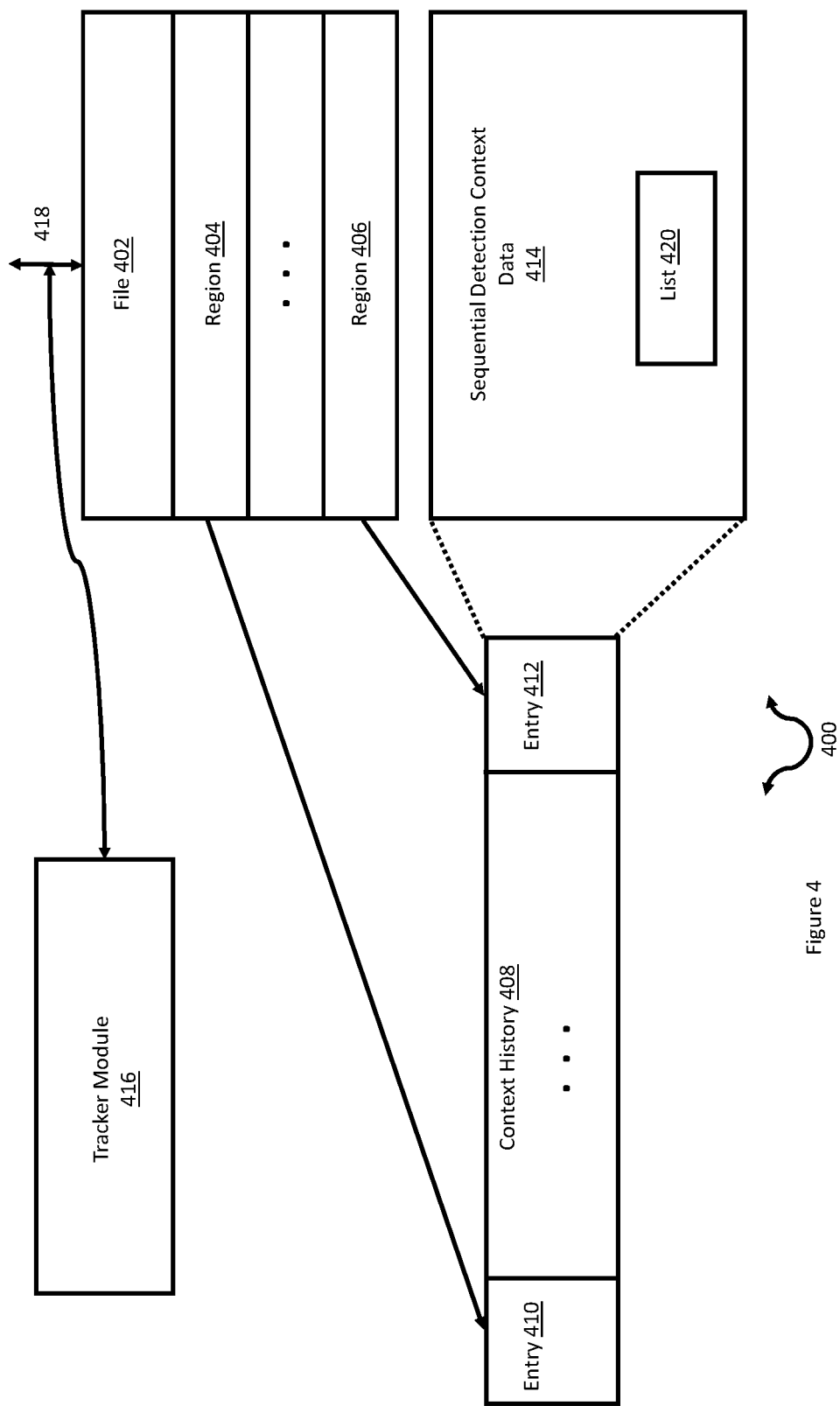
FIG. 4 is an example of a context history that is used to track accesses to a file or portion thereof and detect access patterns in a computing system.

FIG. 4 illustrates an example of a context history used for detecting an access pattern in a data protection system and for pre-fetching data based on the detected access pattern. FIG. 4 illustrates a file 402. The file 402 is the subject, in one embodiment of a read or a write operation and may be stored in or may be being written to the data protection system. The file 402 may be a backup of data, an image, a virtual machine, or any other data that may be stored in a data protection system.

The file 402 is the subject of accesses or IO 418 that are tracked by the tracking module 416. In order to detect one or more access patterns, the file 402 is divided into regions, represented by regions 404 and 406. The number of regions may depend on a size of the file 402 and/or a size of the region. The size of the regions 404 and 406 are typically the same and the size of the regions may be configured by a user or set by default, or selected according to system operating conditions.

The file 402 is associated with a context history 408 (e.g., a context array) that includes an entry for each region of the file 402. By way of example, the region 404 is associated with the entry 410 and the region 406 is associated with the region 412. Each region may include sequential detection context data 414. FIG. 4 illustrates the sequential detection context data associated with the entry 412 that is used to determine or detect access patterns associated with the region 406 of the file 402.

As previously stated, the tracker module 416 may monitor or track the accesses 418 (the IO). Each IO or access (e.g., to the file 402) is recorded in the context history 408 or, more specifically, in the entry of the context history 408 corresponding to the affected region. An access to the region 404, for example, is recorded in the entry 410 while an access to the region 406 is recorded in the entry 412.

Each entry (e.g., the sequential detection context data 414) in the context structure 408 may store metadata that may include, but is not limited to:
  the region associated with the entry (e.g., by offset and length), the number of IOs to track,
  a data sequential threshold,
  an access sequential threshold,
  data sequentiality,
  access sequentiality,
  an index to current IO, and
  a list of recorded IOs (the list of recorded IOs 420 may include, for each IO, an offset, a length, data sequentiality, and access sequentiality.

This information can be used to detect access patterns based on a number of tracked IOs. For example, if each entry stores information for 16 IOs or accesses, the access pattern for the associated region can be determined based on the information in the entry of the context history 408.

More specifically, the region associated with the entry may be identified by an offset and a length. The offset may be a byte address or a logical block address (which is in units of 512 byte sectors). The length may be in bytes or in the number of 512 byte sectors. The number of IOs to track or the number of accesses to track N may relate to the size of the list of the IO history for the region. The number of IOs to track may be organized as a circular buffer when entries are continually appended such that the oldest entry is overwritten when a new entry is added. This is equivalent to a first-in-first-out replacement policy.

The data sequentiality entry is determined based on whether a particular IO is consecutive to at least one of the previously record IOs in the recent history and is assigned to a particular IO. In other words, each IO recorded in the entry of the context history may be associated with a data sequentiality entry. In another example, data sequentiality conveys that the IO was not consecutive with the previous IO but its byte range is consecutive (or overlapping or within a threshold number of bytes) with at least one of the IOs in the sequential detection context data for the region (including the immediately previous IO). In other words, data sequentiality conveys whether a particular IO is consecutive to at least one of the previously recorded IOS recorded in the entry.

Access Sequentiality is based on the data sequentiality in one example. Access sequentiality may be based on how many of the IOs recorded in the entry have data sequentiality. Access sequentiality may be determined based on how many of the IOs seen so far are sequential versus non-sequential based on a threshold. For example, the current history or entry of a region (e.g., the sequential detection context data) may include a history or record of 16 IOs. In this example, 6 of the accesses of IOs are data sequential and IO of the accesses or IOs are not data sequential. The access sequentiality threshold for access sequentiality may be set at 8. Because the number of IOs that are data sequential are below the threshold, the access pattern of the region may be random, but not sequential access.

If a new IO that is recorded in the sequential detection context data 414 has data sequentiality, the data sequentiality changes from 6 sequential and 10 non-sequential (6:10) to 7 sequential and 9 non-sequential (7:9). Because the threshold for sequential IOs has not been reached, the access pattern is still non-sequential or random (although it could be random incremental). When the number of IOs that are data sequential reach the threshold or pass the threshold, the region may be deemed or labeled as sequential.

The index to current IO relates to the position in the IO buffer that was last written or should be written to next.

With the context history 408 that includes an entry for each region of the file, the access patterns or workloads can be detected for each region. This allows access patterns at a storage level perspective to be identified that may not be evident from the file level perspective. To determine whether parallel read processing (e.g., sequential access) is needed or random read batches are needed, an incoming read request is detected by the tracker module and the tracker module can determine the type of access or the access pattern. In one example, there are two kinds of detection being done to check for data sequentiality and access pattern detection.

By default, all incoming IOs are assumed to be sequential until there is a sufficient history of previous IOs to check for random or sequential access patterns. If a sufficient history of IOs or accesses exists, incoming read requests are examined to determine if its offset is sequential relative to any of the previous reads maintained in the appropriate entry of the context history 408. This may be useful because, in one embodiment, even when sequential reads or writes are performed by a client, the read or write request may be out of order due to client behavior (e.g., async read request issued by NFS clients). If the request or access is determined to be sequential to any of the previous IOs, the IO is marked as data sequential. Otherwise, the IO is marked as random.

Even if the read request is data sequential or not, the data sequentiality of the previous recent read requests are counted to determine if the region is access sequential or not based on a threshold. In one example, if more than half of the read requests are sequential, the current access pattern is tagged sequential. If the current request is not sequential but more than half of its previous requests are sequential, the current access pattern is still tagged as sequential. The access pattern is tagged random only when most of its previous requests were determined to be random in one example. When, by way of example only, 16 IOs are tracked (e.g., the 16 most recent IOs), 8 IOs that are not data sequential may be needed in order to tag an access as random or in order to tag a region as sequential. By requiring a certain number of the most recent IOs to be random (or sequential), the IO pattern is less likely to be mislabeled. For example, identifying an IO pattern as random when only one or two of the 16 most recent IOs are random could impact performance of the system adversely. For example, once the random access request is detected, the detected access pattern could enable a random read batch and do parallel read processing if the access type is random. If the detected access pattern is sequential, it may trigger a sequential read batch to pre-fetch data for subsequent accesses.

Also, for read requests to get better performance, pre-fetches may be queued in order to read the metadata and data that would be needed (based on prefetch horizon and granularity). For random reads where prefetches would not be any benefit and consume IO bandwidth, prefetches may be disabled. The access pattern detection is done for metadata and data reads or accesses. However, thresholds to determine sequentiality may be different for them.

The list of recorded IOs 420 can be used to track relationships between the accesses. This may help identify random incremental access patterns.

After an IO pattern is determined for a region or for multiple regions, the data protection system can then pre-fetch data ahead or in advance of the accesses to improve the overall system throughput from the client's perspective. In addition to determining an access pattern as previously discussed, embodiments of the invention allow a client or a file to be labeled even before an access pattern is determined. Thus, the label may allow the access to be pre-determined (but subject to change) or may give a hint as to the anticipated access pattern.

For example, if the data protection system knows that a specific client (e.g., identified by IP address or other label) is associated with known access patterns, a pattern label can be applied to all files written by the client as well as snapshots or other automatically generated versions created from files directly written by the client. In a similar fashion, files or folders may be known to be read with specific patterns. As an example, it may be known by the administrator or by the data protection system that certain files or folders are used by specific applications such as a database or an email server. The known access pattern can be labeled on those specific files or folders and any snapshots or other automatically generated versions created from those files and folders.

As an alternative, when a restore takes place on an unlabeled file, the access pattern can be detected and stored as previously described. If the pattern matches one of the known patterns, then the corresponding label can be applied to the file. As described before, the label will also be applied to files generated from this file.

The label may be as simple as a one byte number with specific integer values indicating an established pattern {NONE, RANDOM, SEQUENTIAL, INCREASING, etc.}. This value can be stored with the meta data representing a file.

In another example, IP addresses can be used as hints about client access patterns. In one example, a mapping between IP address and client function is maintained. Some clients may almost always perform very sequential read patterns. For example, if the server or data protection system reads data, the server is most likely performing a restore operation and the read will be done sequentially. Other clients may typically do random read patterns. For example if the client is an Oracle database the read is most likely a Disaster Recovery event or a Test/Dev event in which case the database will be read live from the data protection system. When the backup database becomes the live database, reads are typically random in nature. By maintaining a mapping of IP address to client function, hints can be obtained that may help determine how or whether to prefetch certain data.

In another example, certain files may be labeled as likely to have a particular access pattern based on how they were created. In another example, an administrator could tag a file, folder or volume with flags indicating the likely access patterns. This tag could change over time.

Virtual synthetic backups using Change-Block-Tracking (CBT) are a good use case for tagging. A virtual synthetic takes only the changed data and reconstructs what looks like a whole file by interleaving pointers to previous versions of the data with the new data. When the data written is from a virtual synthetic CBT use case, the access pattern will be monotonically increasing. However, there can be clusters of highly sequential accesses as well as small or large gaps between accesses, such that the access pattern may appear sequential for a period of time and then non-sequential but monotonically increasing in another. By tagging this file as CBT or random increasing, it can be understood that prefetch may not help even though the accesses may appear sequential at times. In addition the CBT tag can be propagated to the children of the file. Thus, new CBT backups that are based on the current CBT backup can also be tagged as CBT.

Next, access patterns may also change over time. A stream may start as randomly accessed and change to sequential, and vice versa. As an example, Oracle incremental merge has random IOs, then monotonically increasing IOs with large gaps as it scans record headers, and then it is highly sequential as it scans the data. By knowing the file type and the patterns associated we can make better decisions about when to use prefetching. Also, a file that is originally written as a sequential backup may later be read randomly during an instant access event when the client needs to read portions of the file to recover data. So we need to allow the tag or label associated with a file to change over time.

Figure 5:
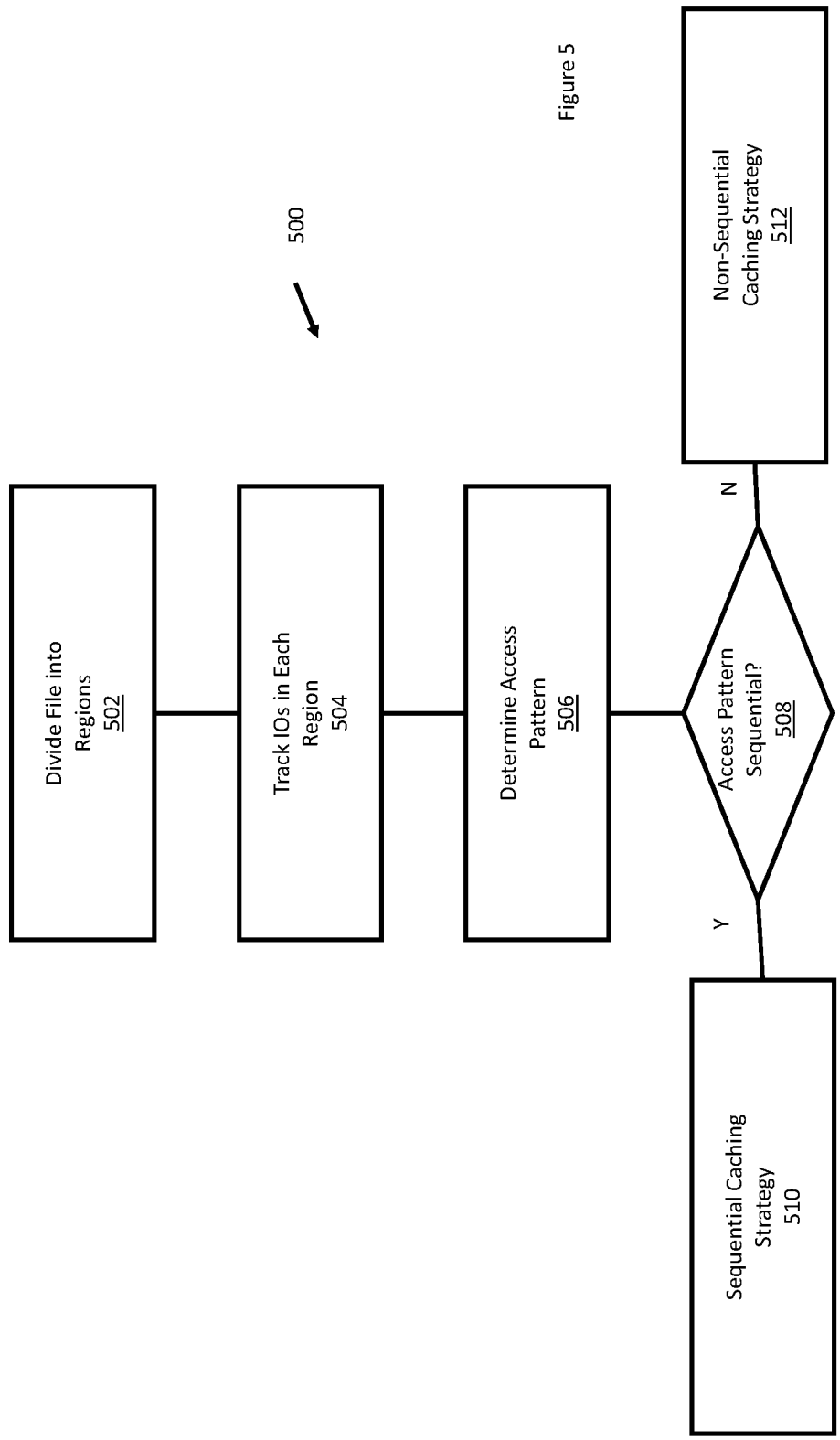
FIG. 5 is an example of a method for detecting access patterns in a computing system.

FIG. 5 illustrates an example of a method for detecting access patterns and/or for pre-fetching data based on detected access patterns. The method 500 may initially divide (502) a file into regions. This may occur in response to a request (e.g., a restore operation, a backup operation, a create file, or the like). The regions, or most of the regions, may have the same size. The size can vary if necessary and may be different for different files.

Next, the IO or accesses is tracked (504) on a per region basis. This includes intercepting or evaluating the IO. For a given IO, the region is determined and the context history is updated based on the IO. The context history for the region can be evaluated to determine data sequentiality, access sequentiality, and the like.

Next, as long as there is sufficient history, an access pattern can be determined (506). The determination of the access pattern may occur every time an IO is processed.

Next, a determination is made (508) based on the determined access pattern. When the access pattern is sequential, a sequential caching strategy (510) may be implemented. This may include prefetching data that is expected to be requested and/or maintaining data that is already present in the cache. If the access pattern is not sequential, a non-sequential caching strategy (512) may be implements. This may include evicting data from the cache to make space for other caching opportunities.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated.

In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for determining an access pattern associated with accesses to a file stored in a computing system, the method comprising:
    dividing the file into regions, wherein each region is associated with accesses;
    tracking the accesses for each region in a context history, wherein the context history stores a history of the accesses for each of the regions;
    determining an access pattern for each region based at least on each respective history;
    implementing a caching strategy based on the determined access pattern of each region;
    adding data to a cache when the access pattern is sequential, wherein the data added is data that is expected to be the subject of subsequent accesses; and
    evicting data from the cache when the access pattern is random.

2. The method of claim 1, further comprising determining a size of the regions.

3. The method of claim 1, further comprising determining the access pattern for a particular region after each access to the particular region.

4. The method of claim 1, wherein the context history includes an entry for each region of the file, wherein each entry in the context history identifies one or more of:
    a region associated with the entry,
    a data sequential threshold,
    an access sequential threshold,
    data sequentiality,
    access sequentiality,
    an index to current IO, and
    a list of recorded IOs.

5. The method of claim 4, wherein the access pattern is sequential when at least half or a majority of the recorded IOs have data sequentiality.

6. The method of claim 4, wherein the access pattern is random when less than half of the recorded IOs have data sequentiality.

7. The method of claim 4, wherein the recorded IOs are stored in a circular buffer such that the access pattern is determined based on a recent number of IOs.

8. The method of claim 4, wherein an access has data sequentiality when an offset of the current IO is sequential to an offset of at least one other access in the context history.

9. The method of claim 8, wherein the access has data sequentiality when the offset is within a threshold number of bytes to at least one other access in the context history.

10. The method of claim 1, further comprising evaluating the detected access pattern as additional accesses are recorded in the context history.

11. The method of claim 1, wherein the access pattern is determined to be one of none, random, increasing, or sequential.

12. The method of claim 1, wherein the regions include a first region and a second region, wherein the access pattern for the first region is determined to be random and the access pattern for the second region is determined to be sequential.

13. The method of claim 1, further comprising determining that the access pattern for at least one of the regions changes from sequential to random or from random to sequential.

14. The method of claim 13, wherein the access pattern for each region is re-evaluated after every access.

15. The method of claim 1, further comprising determining that the file has a pre-determined access pattern that is based on an IP address, an administrator label, or application type.

16. The method of claim 15, wherein the predetermined access pattern is subject to change and is re-evaluated as the accesses are tracked.

17. The method of claim 1, wherein a caching strategy of pre-fetching data or metadata or evicting data or metadata changes in accordance with the currently determined access pattern for each of the regions.

18. A method for determining an access pattern associated with accesses to a file stored in a computing system, the method comprising:
    dividing the file into regions, wherein each region is associated with accesses;
    tracking the accesses for each region in a context history, wherein the context history stores a history of the accesses for each of the regions;
    determining an access pattern for each region based at least on each respective history;
    adding data to a cache when the access pattern is sequential, wherein the data added is data that is expected to be the subject of subsequent accesses; and
    implementing a caching strategy of pre-fetching data or metadata or evicting data or metadata changes in accordance with the currently determined access pattern for each of the regions.

* * * * *